(12) United States Patent
Okuzawa (10) Patent No.: US 12,314,497 B2
(45) Date of Patent: May 27, 2025

(54) INFORMATION PROCESSING APPARATUS, INFORMATION PROCESSING SYSTEM, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Masahiko Okuzawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/758,942

(22) Filed: Jun. 28, 2024

(65) Prior Publication Data

US 2025/0013323 A1    Jan. 9, 2025

(30) Foreign Application Priority Data

Jul. 3, 2023 (JP) .................. 2023-109527

(51) Int. Cl.
   *G06F 3/038* (2013.01)
   *G06F 3/01* (2006.01)

(52) U.S. Cl.
   CPC .............. *G06F 3/038* (2013.01); *G06F 3/011* (2013.01); *G06F 3/017* (2013.01); *G06F 2203/0331* (2013.01)

(58) Field of Classification Search
   CPC .......... G06F 3/038; G06F 3/011; G06F 3/017; G06F 2203/0331; G06F 3/012; G06F 3/013; G06F 3/014; G06F 3/0346; G06F 3/0304
   See application file for complete search history.

(56) References Cited

U.S. PATENT DOCUMENTS

| | | | | |
|---|---|---|---|---|
| 2016/0282619 A1* | 9/2016 | Oto | .................. | A63F 13/25 |
| 2019/0187244 A1* | 6/2019 | Riccardi | ................ | G01S 5/186 |
| 2020/0393534 A1* | 12/2020 | Przbyla | .................. | G01S 5/186 |
| 2020/0393683 A1* | 12/2020 | Matsuoka | ............ | G02B 27/017 |

FOREIGN PATENT DOCUMENTS

| | | |
|---|---|---|
| JP | 2020519992 A | 7/2020 |
| JP | 2021060627 A | 4/2021 |
| JP | 2023001160 A | 1/2023 |

* cited by examiner

*Primary Examiner* — Jonathan A Boyd
(74) *Attorney, Agent, or Firm* — Canon U.S.A., Inc. IP Division (57) ABSTRACT

An information processing apparatus includes a processor, and a memory storing a program which, when executed by the processor, causes the information processing apparatus to acquire information about a position or an attitude of a controller, control a display to display a virtual object based on a first reference being a reference for displaying the virtual object, the reference being set in advance, and the acquired information, set a second reference as a substitute for the first reference, control, in a case where the second reference is set, the display to display the virtual object based on the second reference and the acquired information, and receive first operation from the controller based on a position of the virtual object displayed based on set reference.

19 Claims, 9 Drawing Sheets

INFORMATION PROCESSING APPARATUS, INFORMATION PROCESSING SYSTEM, METHOD OF CONTROLLING INFORMATION PROCESSING APPARATUS, AND STORAGE MEDIUM

BACKGROUND

Field of the Disclosure

The present disclosure relates to an information processing apparatus.

Description of the Related Art

To control display on a head-mounted display (HMD) in an existing cross reality (XR) system that allows a user to experience virtual reality, a hand controller is used to convert a motion of a hand into an operation in a virtual space. The HMD is a grasses-type apparatus including a small display, attached to the head of the user. When the user performs a user interface (UI) operation via the HMD, the hand controller is used to convert a motion of the hand into an operation in the virtual space. Based on a position and an attitude of the hand controller, computer graphics (CG), such as a virtual ray and a virtual pointer, are displayed on a screen. The CG enable the user to know a designated position and to freely operate a virtual object.

For example, Japanese Unexamined Patent Application Publication (Translation of PCT Application) No. 2020-519992 discusses a technique relating to a hand controller that emits a plurality of infrared rays (IR rays) from the hand controller. The infrared rays are received by a camera mounted on the HMD, thereby the hand controller can detect a position and an attitude of a hand. Japanese Patent Application Laid-Open No. 2021-60627 discusses a technique relating to an apparatus that compares a body part of a user in an image captured by a camera mounted on the HMD with a skeleton model stored in a memory, and reflects a position and an attitude of the user in a virtual space. By using such techniques, a ray or a pointer, which is the CG for indicating an object designated by the user, can be displayed in response to a movement of the controller.

In the above-described existing techniques, however, when operation is performed on a virtual object by using a ray or a pointer, a direction of the ray or the pointer output from the controller is previously determined. Depending on the virtual object the user wants to designate, the user has to continuously extend an arm forward in some cases. When the user has to continuously designate the virtual object for a long time, the arm gets tired.

SUMMARY

Therefore, the present disclosure is directed to, as a user interface for a virtual reality (VR) system, a mixed reality (MR) system, or the like, a high-convenience user interface that displays a ray or a pointer in a direction desired by a user, thereby enabling the user to designate a virtual object. According to an aspect of the present disclosure, an information processing apparatus connected to or integrated into a head-mounted display apparatus includes a processor, and a memory storing a program which, when executed by the processor, causes the information processing apparatus to acquire information about a position or an attitude of a controller, control a display to display a virtual object based on a first reference being a reference for displaying the virtual object, the reference being set in advance, and the acquired information, set a second reference as a substitute for the first reference to indicate a predetermined region designated by a user with a position or an attitude of the controller at a predetermined time point, control, in a case where the second reference is set, the display to display the virtual object based on the second reference and the acquired information, and receive, in a case where the second reference is not set, first operation from the controller based on a position of the virtual object displayed based on the first reference, and receive, in a case where the second reference is set, the first operation from the controller based on a position of the virtual object displayed based on the second reference.

Further features of the present disclosure will become apparent from the following description of exemplary embodiments with reference to the attached drawings.

DESCRIPTION OF THE EMBODIMENTS

Some exemplary embodiments are described in detail below with reference to the accompanying drawings. The following exemplary embodiments are not intended to limit the disclosure set forth in the claims. Although a plurality of features is described in the exemplary embodiments, not all of the plurality of features is necessarily essential for the disclosure, and the plurality of features may be optionally combined. In the accompanying drawings, identical or similar components are denoted by the same reference numerals, and redundant descriptions thereof will be omitted.

Figure 1:
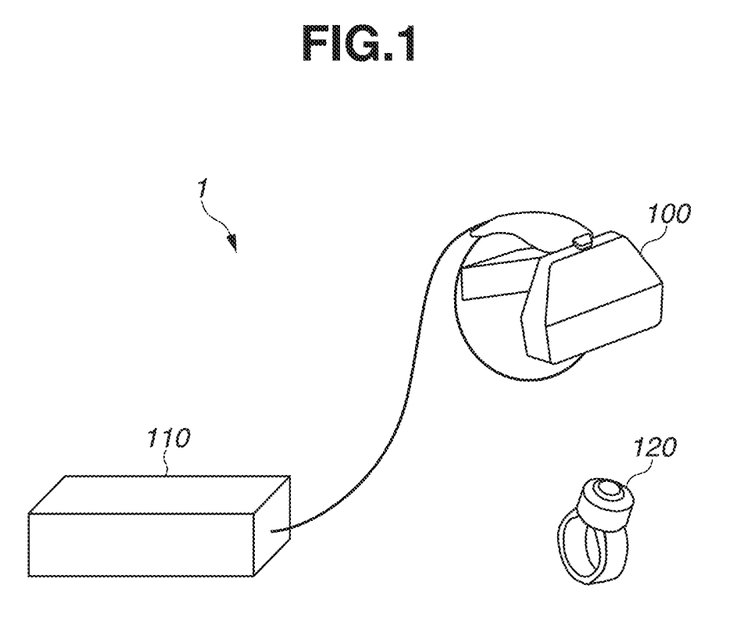
FIG. 1 is a diagram illustrating an information processing system according to one or more aspects of the present disclosure.

An information processing system 1 according to a first exemplary embodiment is described with reference to FIG. 1. The information processing system 1 includes a head-mounted display (HMD) 100, a personal computer (PC) 110, and a controller 120.

The HMD 100 is a head-mounted display apparatus (electronic apparatus) that can be mounted on the head of a user. The HMD 100 displays a combined image obtained by combining a captured image of a range in front of the user captured by the HMD 100 and contents, such as computer graphics (CG), in a form corresponding to an attitude of the HMD 100.

The PC 110 controls the HMD 100. The PC 110 is connected to the HMD 100 via wired connection using, for example, a universal serial bus (USB) cable, or via wireless connection using, for example, Bluetooth® or Wireless Fidelity (Wi-Fi®). The PC 110 combines the captured image and the CG to generate a combined image, and transmits the combined image to the HMD 100. Herein, the PC is described as an example of an information processing apparatus; however, the information processing apparatus is not limited thereto. For example, the information processing apparatus may be a smartphone or a tablet terminal, and components of the PC 110 may be included in the HMD 100.

The controller 120 performs various kinds of control of the HMD 100. When the PC 110 operates in a specific control mode and the user performs operation on the controller 120, the HMD 100 is controlled in response to the operation by the user. As illustrated in FIG. 1, the controller 120 may be of a ring type mounted on and supported by a finger of the user, or of a handheld type held by a hand. The controller 120 includes a physical button for performing a determination operation or a selection operation on a display. The controller 120 performs wireless communication using Bluetooth® with the PC 110.

The user can change a designated position on the display corresponding to a movement of the controller 120 by moving the controller 120. The designated position can be represented by a point, or by a virtual ray connecting the point of the designated position and the controller with a straight line (line segment) or a dotted line. The user can perform the determination operation or the selection operation of a menu by pressing down the physical button. As the type of the controller 120, the ring type and the handheld type are described above; however, the type of the controller 120 is not limited thereto as long as the controller 120 can be supported by a finger, a hand, or an arm. While the physical button has been described above, the button can be any operable member, such as a track pad, a touch panel, a wheel, and a track ball, and the operation may be a slide operation, a flick operation, and a touch-on operation in addition to pressing down of the button.

The controller 120 may be mounted on at least any of a finger, a hand, and an arm.

<Internal Configuration of HMD>

Figure 2:
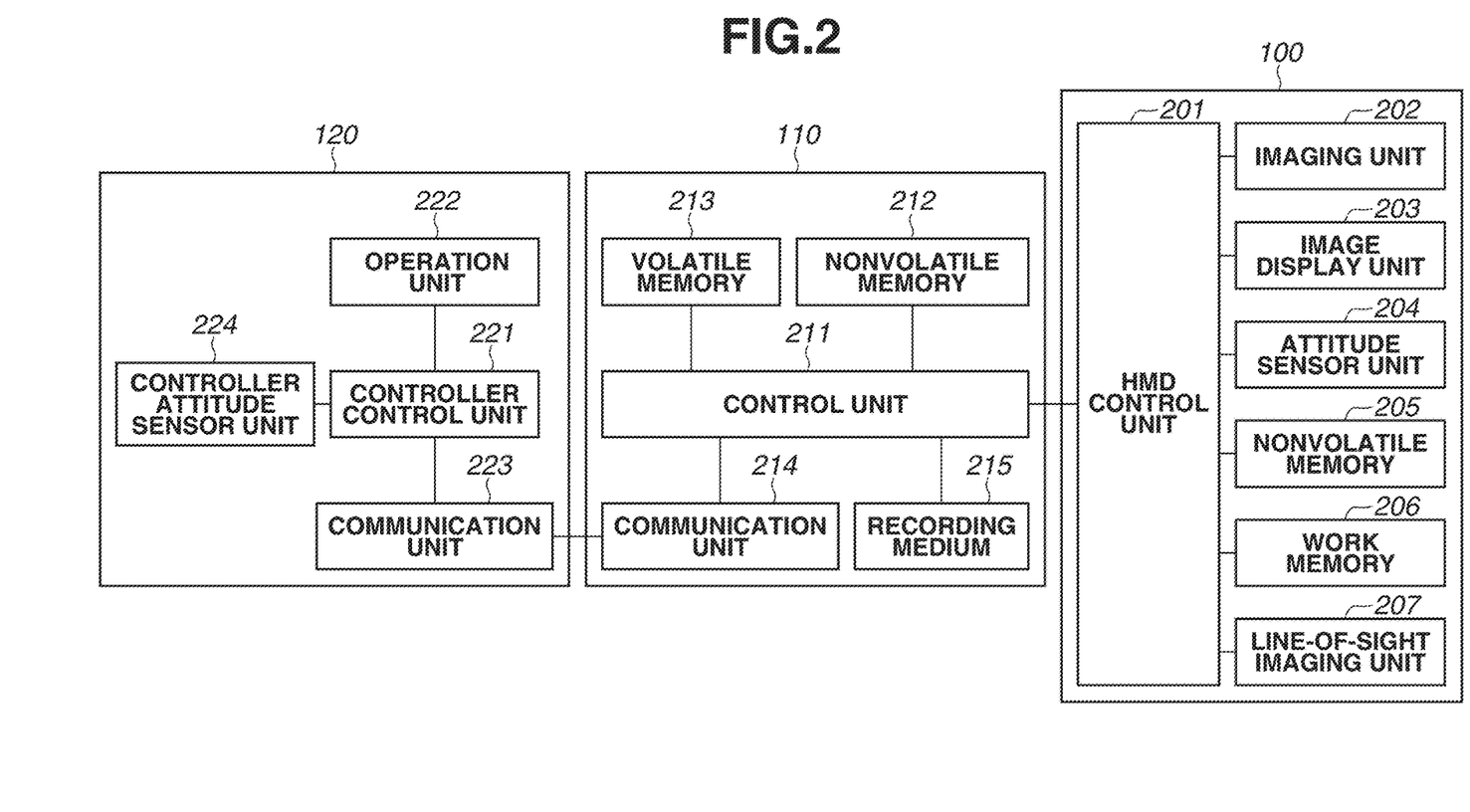
FIG. 2 is an internal configuration diagram of a head-mounted display (HMD) and the like according to one or more aspects of the present disclosure.

An internal configuration of the HMD 100 is described with reference to FIG. 2. The HMD 100 includes an HMD control unit 201, an imaging unit 202, an image display unit 203, an attitude sensor unit 204, a nonvolatile memory 205, and a work memory 206.

The HMD control unit 201 is a central processing unit (CPU) controlling components of the HMD 100. The HMD control unit 201 acquires the combined image, i.e., the image obtained by combining the captured image of a space in front of the user captured by imaging unit 202 and CG, from the PC 110, and displays the combined image on the image display unit 203. Instead of controlling the entire HMD 100 by the HMD control unit 201, a plurality of hardware components may share processing to control the entire HMD 100.

The imaging unit 202 includes two cameras (imaging devices). To capture a video image or an image of a space similar to a space that the user normally sees, the two cameras are disposed near positions of right and left eyes of the user when the HMD 100 is mounted on the user. Images of an object (range in front of user) captured by the two cameras are output to the PC 110 and the HMD control unit 201. The two cameras of the imaging unit 202 can acquire, as distance information, information on a distance from the two cameras to the object through ranging by a stereo camera. The imaging unit 202 may be capturing and outputting a video image during the capturing of the object.

The image display unit 203 displays the combined image. The image display unit 203 includes a liquid crystal panel, an organic electroluminescence (EL) panel, or the like. In a state where the user is wearing the HMD 100, organic EL panels are disposed in front of the eyes of the user. A device using a semi-transparent half mirror may be used for the image display unit 203. In this case, for example, the image display unit 203 may display an image so that the CG appear as if the CG are directly superimposed on a real space seen through the half mirror, by using a technique generally referred to as augmented reality (AR). Alternatively, the image display unit 203 may display an image of a complete virtual space without using any captured images, by using a technique generally referred to as virtual reality (VR).

The attitude sensor unit 204 acquires attitude (and position) information on the HMD 100. The attitude sensor unit 204 also acquires attitude information on the user (user wearing HMD 100) corresponding to an attitude (and position) of the HMD 100. The attitude sensor unit 204 includes an inertial measurement unit (IMU) including an acceleration sensor, an angular acceleration sensor, and a geomagnetic sensor. The attitude sensor unit 204 is used to acquire information on an attitude (attitude information) of the user, and the HMD control unit 201 outputs the information on the attitude (attitude information) of the user to the PC 110.

The HMD control unit 201 estimates positions or attitudes of joint points of hands and fingers of the user from the two camera images obtained by the imaging unit 202. The joint points include feature points of parts, such as joints of fingers, fingertips, the back of hands (palm of hands), and arms. Each of the joint points indicates a coordinate position, and the attitude can be estimated from information on the plurality of joint points. As a method of estimating the positions or attitudes of the hands and the joint points of the hands, for example, a known object recognition or pose estimation method by machine learning using a convolutional neural network can be used. Further, the positional information on each of the joint points of the hands in a depth direction can be obtained by calculating a distance from the imaging unit 202 to each of the joint points, for example, through triangulation by stereo matching using the two camera images obtained by the imaging unit 202. The estimated positional information on each of the joint points of the hands is output from the HMD control unit 201 to the PC 110. The HMD control unit 201 may estimate the position and the attitude of each of the joint points of the hands and fingers of the user.

The nonvolatile memory 205 is an electrically erasable and writable nonvolatile memory, and stores a program described below to be executed by the HMD control unit 201, and the like.

The work memory 206 is used as a buffer memory that temporarily stores image data captured by the imaging unit 202, as an image display memory for the image display unit 203, as a work area for the HMD control unit 201, and the like.

A line-of-sight imaging unit 207 is a camera that acquires an image for detecting a line of sight of the user, and is attached to the inside of the HMD 100 in order to image eyes of the user when the user wears the HMD 100. An image of an object (eyes of user) captured by the camera is output to a control unit 211 of the PC 110 through the HMD control unit 201. The control unit 211 detects the line of sight of the user wearing the HMD 100 from the image captured by the line-of-sight imaging unit 207, and specifies a portion of the image display unit 203 at which the user is gazing.

<Internal Configuration of Controller>

An internal configuration of the controller 120 is described with reference to FIG. 2. The controller 120 includes a controller control unit 221, an operation unit 222, a communication unit 223, and a controller attitude sensor unit 224.

The controller control unit 221 is a CPU that controls components of the controller 120.

Instead of controlling the entire controller 120 by the controller control unit 221, a plurality of hardware components may share processing to control the entire controller 120.

The operation unit 222 includes a button. The operation unit 222 detects whether the button has been pressed down, and transmits detection information to the PC 110 via the communication unit 223.

The communication unit 223 performs wireless communication using Bluetooth® with the PC 110.

The controller attitude sensor unit 224 includes an IMU including an acceleration sensor, an angular acceleration sensor, and a geomagnetic sensor. The IMU detects a change in position or attitude of the controller 120. Detected change information on the position or the attitude is transmitted from the communication unit 223 to the PC 110 via the controller control unit 221. The IMU may detect changes in the position and the attitude of the controller 120.

<Internal Configuration of PC>

An internal configuration of the PC 110 is described with reference to FIG. 2. The PC 110 includes the control unit 211, a nonvolatile memory 212, a volatile memory 213, a communication unit 214, and a recording medium 215.

The control unit 211 is a CPU that controls components of the PC 110 based on an input signal and a program described below. Instead of controlling the entire PC 110 by the control unit 211, a plurality of hardware components may share processing to control the entire PC 110. The control unit 211 receives the images (captured images) acquired by the imaging unit 202, and the attitude information acquired by the attitude sensor unit 204 from the HMD 100. The control unit 211 performs image processing on the captured images to cancel aberration in an optical system of the imaging unit 202 and an optical system of the image display unit 203. Further, the control unit 211 combines the captured images and desired CG to generate a combined image. The control unit 211 transmits the combined image to the HMD control unit 201 of the HMD 100. Further, the control unit 211 acquires a coordinate of the HMD 100 in a real space based on the captured images acquired from the imaging unit 202.

The control unit 211 may acquire the coordinate of the HMD 100 in the real space based on the captured images acquired from the imaging unit 202 and the information (distance information and attitude information) acquired by the HMD 100.

The control unit 211 controls a position, a direction, and a size of the CG in the combined image based on the information (distance information and attitude information) acquired by the HMD 100. For example, in a case where, in a space represented by the combined image, a virtual object represented by the CG is disposed near a specific object present in the real space, the control unit 211 increases the size of the virtual object (CG) as a distance between the specific object and the imaging unit 202 is smaller. By controlling the position, the direction, and the size of the CG in such a manner, the control unit 211 can generate the combined image in which the CG object not disposed in the real space appears as if the object is disposed in the real space.

The control unit 211 receives the information estimated by the HMD control unit 201 of the HMD 100. The received information is temporarily stored in the volatile memory 213.

The communication unit 214 receives the change information on the position or the attitude of the controller 120 from the communication unit 223 of the controller 120. The control unit 211 superimposes and displays a designated position corresponding to the change information on the position or the attitude of the controller 120, on the combined image. Alternatively, the communication unit 214 may receive the change information on the position and the attitude of the controller 120 from the communication unit 223 of the controller 120. The control unit 211 may superimpose and display the designated position corresponding to the change information on the position and the attitude of the controller 120, on the combined image.

The nonvolatile memory 212 is an electrically erasable and writable nonvolatile memory, and stores a program described below to be executed by the control unit 211 and information on the CG and the like. The control unit 211 can change the CG (i.e., CG used for generation of combined image) to be read from the nonvolatile memory 212.

The volatile memory 213 is used as a buffer memory that temporarily stores image data captured by the imaging unit 202 and time-series information on the estimated coordinate position of each of the joint points of the hands, as an image display memory for the image display unit 203, as a work area for the control unit 211, and the like.

The estimation of the coordinate position of each of the joint points of the hands may be performed by the PC 110. In this case, after the captured images are output from the imaging unit 202 to the PC 110, the control unit 211 of the PC 110 estimates the position or the attitude of each of the joint points of the hands, processes the images by using information on the position or the attitude thereof, and outputs the processed images to the HMD 100. Alternatively, the control unit 211 may estimate the position and the attitude of each of the joint points of the hands, process the images by using information on the position and the attitude thereof, and output the processed images to the HMD 100.

<Ray Display>

Pointer operation using the controller 120 is described with reference to FIG. 4.

Figure 4:
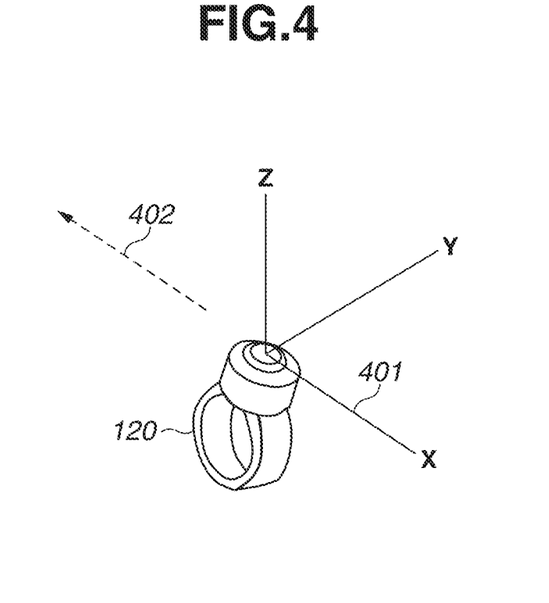
FIG. 4 is a diagram illustrating a predetermined pointer output direction according to one or more aspects of the present disclosure.

The controller 120 illustrated in FIG. 4 is the above-described ring type controller, and a three-dimensional controller coordinate system 401 (X, Y, Z) is defined with the position and the attitude of the controller 120 as a reference.

The control unit 211 receives sensor data acquired by the controller attitude sensor unit 224 from the controller 120 via the communication unit 214 and the communication unit 223, and calculates the position and the attitude of the controller 120 based on the sensor data. The position and the attitude of the controller 120 can be calculated using a known technique.

In addition, the position and the attitude of the controller 120 are specified by a method of specifying a position and an attitude of a controller using image recognition, or the like. As the method of specifying the position and the attitude of the controller by using the image recognition, a known technique, such as machine learning, can be used.

A pointer is set to be directed in a predetermined direction relative to the controller 120. In other words, the pointer is set to be directed from the controller 120 in the predetermined direction based on a predetermined reference. In an initial state before processing for adjusting the direction of the pointer (hereinafter, calibration) is performed, the pointer direction is set to, for example, a direction 402 toward a front side relative to the controller 120. By performing the above-described setting, the user can operate the pointer to move in response to a motion of a hand wearing the controller. In the first exemplary embodiment, to enable the user to easily recognize the position of the pointer, the control unit 211 combines, with the pointer, CG that represent a ray extending from the controller 120 in the direction 402.

<Calibration Processing>

Processing of the calibration is described with reference to the flowchart in FIG. 3. It is assumed that, before the flowchart starts, an operation mode of the HMD 100 is set to a calibration mode.

In step S301, the control unit 211 acquires the position and the attitude of the HMD 100.

The control unit 211 performs control to estimate the position and the attitude of the HMD 100 from the images captured by the imaging unit 202, and acquires estimated positional information and attitude information.

In step S302, the control unit 211 acquires the position and the attitude of the controller 120.

The control unit 211 acquires sensor information acquired by the controller attitude sensor unit 224 through wireless communication by the communication unit 214 and the communication unit 223, and acquires the position and the attitude of the controller 120. The control unit 211 further detects the controller 120 from the images captured by the imaging unit 202, and acquires the position and the attitude of the controller 120 through conversion into a spatial coordinate system in the virtual space.

In step S303, the control unit 211 detects a line of sight to acquire a position at which the user is gazing in the real space. The control unit 211 may acquire a region at which the user is gazing. The control unit 211 images eyes of the user wearing the HMD 100 by the line-of-sight imaging unit 207. Further, the control unit 211 detects a gaze point on the image display unit 203 from the captured image, thereby specifying a gaze point in the virtual space. As a method of imaging the eyes of the user to detect the line of sight, any known technique can be used.

In step S304, the control unit 211 determines whether the calibration has been completed. The control unit 211 compares the positional information and the attitude information on the controller 120 acquired in step S302 and the line-of-sight information acquired in step S303, with information previously acquired, thereby determining respective change amounts in a predetermined time period. In a case where each of the change amounts is less than or equal to a predetermined amount, the control unit 211 determines that the calibration has been completed (YES in step S304), and the processing proceeds to step S305. In a case where the change amount is not less than or equal to the predetermined amount (NO in step S304), the processing proceeds to step S301. Completion of the calibration may be determined based on whether the operation unit 222 of the controller 120 has been operated. Alternatively, the completion of the calibration may be determined using blinking of the eyes of the user. In a case where the completion of the calibration is determined by a method other than the method in which the button of the controller 120 is operated, deviation of the position and the attitude of the controller 120 due to a button operation does not occur. This achieves a specific effect that a ray output direction desired by the user is settable.

In step S305, the control unit 211 determines the ray output direction. The control unit 211 determines the ray output direction such that the ray is directed toward the position of the line of sight acquired in step S303 based on the positional information and the attitude information on the controller 120 acquired in step S302.

In step S306, the control unit 211 calculates a correction amount. The control unit 211 determines the ray output direction and calculates the correction amount from the information acquired in steps S301, S302, and S303. The processing then ends.

Figure 3:
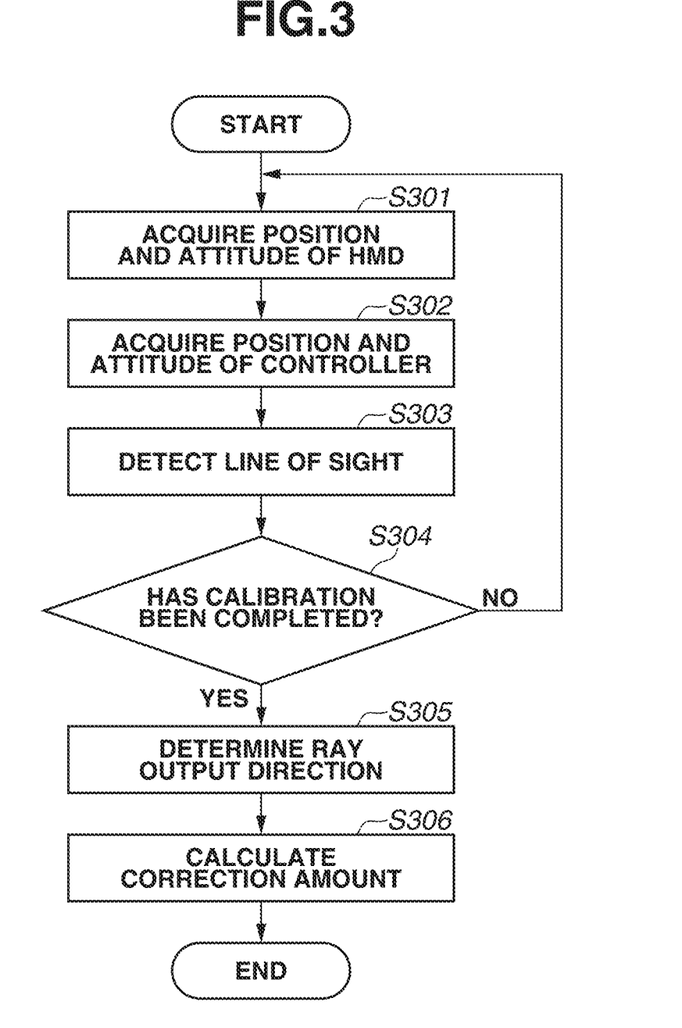
FIG. 3 is a flowchart illustrating a procedure of processing for determining a ray output direction according to one or more aspects of the present disclosure.
Figure 5A:
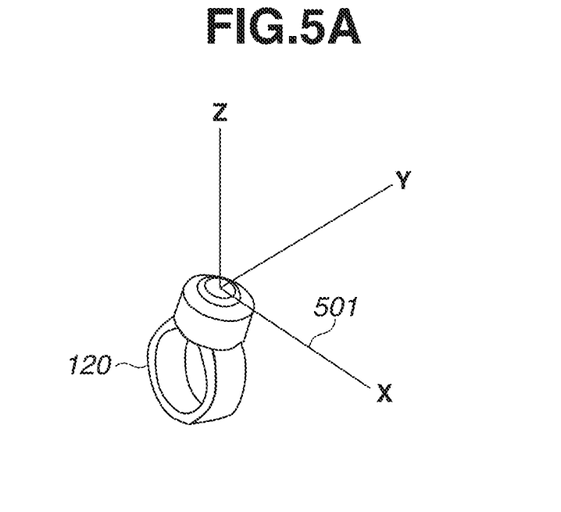
FIG. 5A is a diagram illustrating a pointer output direction before calibration according to one or more aspects of the present disclosure.
Figure 5B:
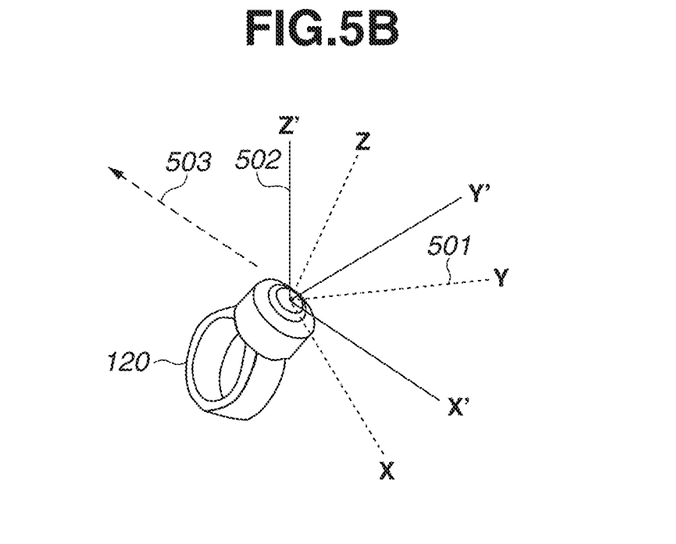
FIG. 5B is a diagram illustrating a pointer output direction after calibration according to one or more aspects of the present disclosure.

The processing in steps S305 and S306 in FIG. 3 is described with reference to FIGS. 5A and 5B. With respect to a controller coordinate system 501 (X, Y, Z) in the initial state before the calibration is performed illustrated in FIG. 5A, a new controller coordinate system 502 (X', Y', Z') is set so as to be adapted to the ray output direction 503 determined in step S305. A transformation matrix from the coordinate system 501 to the coordinate system 502 is calculated as the correction amount, and the correction amount is recorded in a memory. As the correction amount, a correction value represented by a rotation angle of the coordinate system, or a correction value represented by a length of parallel shift of the coordinate system. In FIGS. 5A and 5B, an origin is drawn at the same position before and after the calibration; however, the origin after the calibration may be adjusted to a different position based on preferences of the user. In other words, a starting point of the ray may be adjusted to a different position.

In the flowchart in FIG. 3, the information on the line of sight is acquired and the gaze region is displayed, and the ray output direction is determined by assuming that the position and the attitude of the controller 120 at a certain time point indicate the region. However, in place of the gaze region, a region indicated by the controller may be set and the ray may be displayed based on feature points of a real object, or the ray may be displayed such that the controller indicates a region of a virtual object. In a case where a pointer of the line of sight indicating the position of the line of sight is displayed, the gaze region may be the same region as a region of the pointer of the line of sight, may be a region having an area greater than an area of the region of the pointer of the line of sight, or may be a region having an area smaller than the area of the region of the pointer of the line of sight.

<Ray Display During Correction>

Figure 6A:
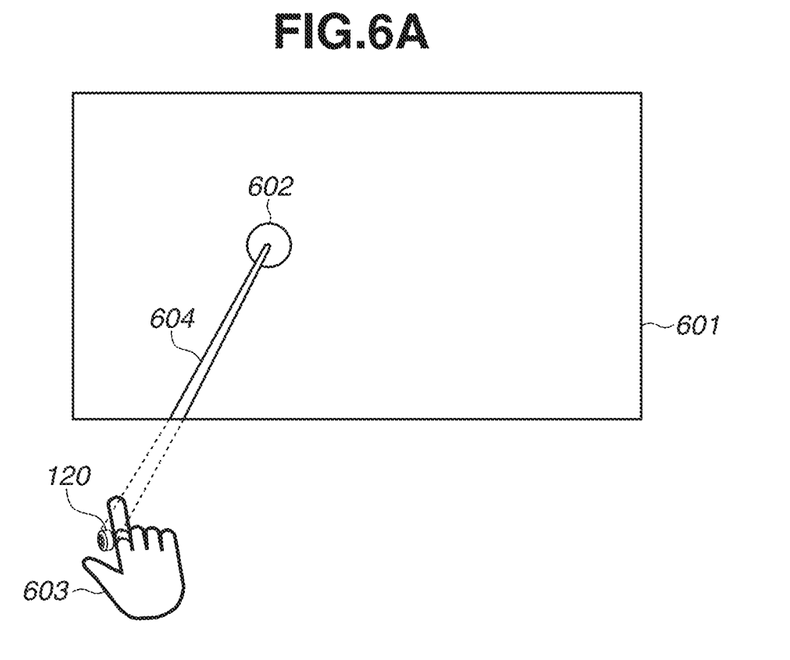
FIG. 6A is a diagram illustrating displayed contents during the calibration according to one or more aspects of the present disclosure.
Figure 6B:
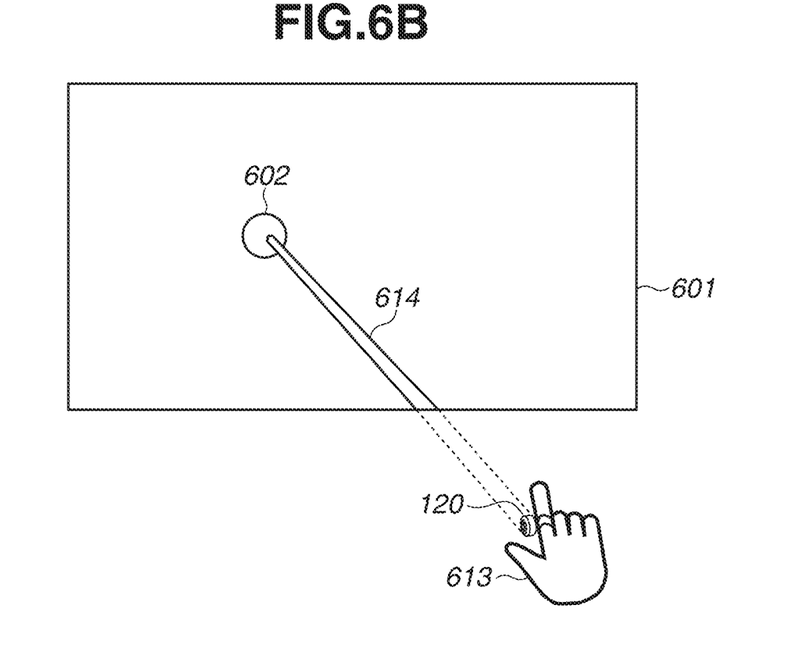
FIG. 6B is a diagram illustrating displayed contents during the calibration according to one or more aspects of the present disclosure.

Display on the image display unit 203 during the calibration is described with reference to FIGS. 6A and 6B. FIGS. 6A and 6B are diagrams each illustrating a scene where a position on a screen to be adjusted by the calibration is displayed so as to be recognized by the user. A display screen 601 corresponds to the image display unit 203. A region 602 at which the user is gazing on the screen is represented by a virtual object, and ray output is adjusted such that the ray is directed in a direction of the virtual object. On the display screen 601, a ray is displayed such that the ray is directed from the controller 120 mounted on a hand at a position 603 toward the region 602, which enables the user to recognize the pointer direction. When the calibration is not completed, the ray directed from the controller 120 toward the region 602 is constantly displayed. For example, in a case where the hand of the user is present at the position 603 as illustrated in FIG. 6A, a ray 604 is displayed such that the ray 604 is directed from the controller 120 mounted on the hand at the position 603 toward the region 602. In a case where the hand of the user is present at a position 613 as illustrated in FIG. 6B, a ray 614 is displayed such that the ray 614 is directed from the controller 120 mounted on the hand at the position 613 toward the region 602. As described above, the position to which the ray is to be adjusted is presented to the user to facilitate the calibration.

Figure 7:
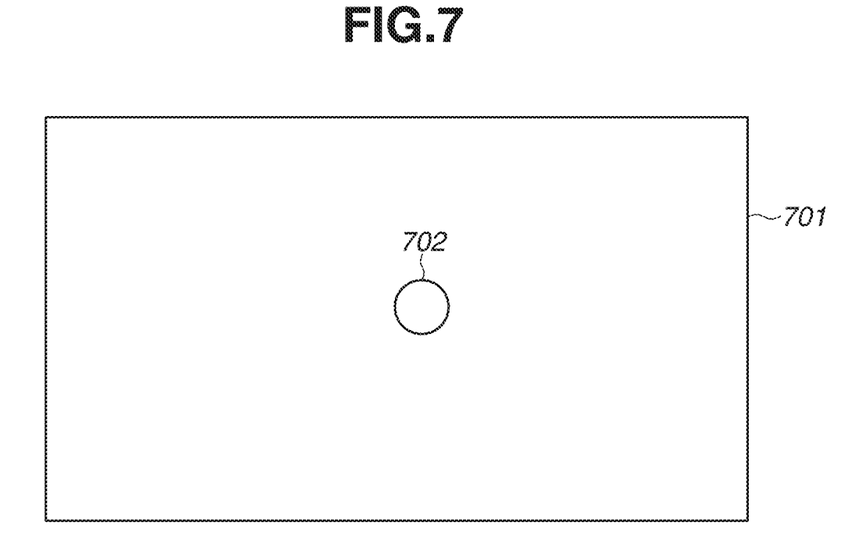
FIG. 7 is a diagram illustrating object display according to one or more aspects of the present disclosure.

In step S303, the position of the line of sight of the user is detected, and the ray is adjusted so as to be directed in the direction of the line of sight. However, to prevent the user from becoming confused about a position to point at, the user may designate a predetermined position on the screen, and designate an attitude for pointing at the position, i.e., the position and the attitude of the controller indicating the predetermined position. For example, as illustrated in FIG. 7, a CG object 702 is displayed on a display screen 701 corresponding to the image display unit 203, and a notification prompting the user to take an attitude for pointing at the CG object 702 is issued to the user. In this case, in the determination of the completion of the calibration in step S304, it is determined that the calibration has been completed when the position of the line of sight is present on the CG object 702 for a predetermined time period, and the change amounts of the positional information and the attitude information on the controller 120 are less than or equal to the predetermined amounts. The predetermined time period is settable to any time period, and is, for example, five seconds. In a case where the predetermined time period is set to five seconds, it is determined that the calibration has been completed at a time point when the position of the line of sight is on the CG object 702 for the predetermined time period and a state where the change amounts of the positional information and the attitude information on the controller 120 are less than or equal to the predetermined amounts is continued for five seconds. The predetermined time period may be previously determined or set by the user. The region 602 is described as the gaze region, i.e., the region based on the line of sight, but may be any region such as a region of a virtual object different from the virtual object corresponding to a movement of the controller, such as the ray or the pointer. Further, in place of the region 602, a region based on a real object may be set. For example, a region having a feature of the real object may be determined and selected. The completion of the calibration may be determined at a time point when input from the button of the controller 120 is received, or the user may be prompted to perform a specific operation on the controller 120 to complete the calibration.

In a case where the operation mode is set to the calibration mode, a color of the virtual object, such as the ray or the pointer, may be changed so that the user recognizes that the calibration mode is set. The color of the virtual object may be changed, for example, until the processing in the flowchart in FIG. 3 is completed. In other words, the color of the virtual object may be changed while the virtual object is displayed such that the controller 120 indicates the region 602 even when the controller 120 is moved, as illustrated in FIGS. 6A and 6B.

<Coordinate System of Controller>

In the first exemplary embodiment, the ring type controller is described as an example; however, the controller may be of a grip type, i.e., of a handheld type. In this case, a plurality of coordinate systems may be set for the controller. For example, the coordinate system for representing the position of the controller may be set to a position near a grip, and a reference coordinate system for the pointer (hereinafter, pointer coordinate system) may be set to a position near a front end of the controller, for operation of the ray. In this case, in the calibration, a reference coordinate for operation of the ray is corrected. In an environment where an application can be installed and executed in the PC 110, the positional information and the attitude information on the controller 120 in the pointer coordinate system corrected based on correction information stored in the volatile memory 213 is transmitted from the control unit 211 to the application. As a result, the application can perform processing of the ray without being conscious of the calibration.

In the first exemplary embodiment, the method of adjusting the ray to the position of the line of sight is described; however, the ray output direction may be adjusted by user operation using an optical tracking pointer (OTP).

While the positions and the attitudes are acquired for the HMD and the controller, only the positions or only the attitudes may be acquired. In a case where the processing described in the first exemplary embodiment is performed by acquiring only the positions, even when the attitude of the controller is changed, the virtual object is not changed, and is only operated by using a parallel shift. For example, in a case where the user wants to designate, in a sitting posture, a region that can be designated in a standing posture, it is sometimes difficult for the user to designate the region because of a height difference depending on the region to be designated. In such a case, by changing the ray output direction, the user can designate any position on the screen within a movable range of the hand and the arm of the user without difficulty. In a case where the processing described in the first exemplary embodiment is performed by acquiring only the attitudes, even when the controller is parallelly shifted, the ray is output with a predetermined position as the starting point. When the attitude of the controller is changed, the ray direction is changed. To designate a front direction of the user, the user is required to continuously direct the controller in the front direction, and the user may get tired. In such a case, by changing the ray output direction, the user can designate the front direction without continuously directing the controller in the front direction. For example, the ray output direction can be changed such that the ray is output in the front direction of the user even while the controller is directed to a ground surface.

As described above, in the first exemplary embodiment, the ray output direction is calibrated and corrected based on the position of the line of sight of the user. This makes it possible to easily implement the ray operation suitable for the user, and to provide the high-convenience user interface.

In a second exemplary embodiment, a system that automatically performs the calibration mode and automatically adjusting the ray output direction is described.

There is a case where the calibration is performed in a manner described in the first exemplary embodiment, but a surrounding situation is changed after an elapse of a certain time, and the operation in the attitude previously calibrated becomes difficult. In the second exemplary embodiment, in such a case, automatic determination and calibration are performed. A basic configuration according to the second exemplary embodiment is similar to the configuration according to the first exemplary embodiment. Thus, description of the configuration is omitted.

The calibration processing according to the second exemplary embodiment is described with reference to the flowchart in FIG. 8. It is assumed that, before the flowchart starts, the calibration has already been performed once. A scene where the calibration mode is automatically performed according to the second exemplary embodiment is described with reference to FIGS. 9A and 9B. FIG. 9A is a diagram illustrating the ray after the calibration is performed. A virtual object 902 that the user wants to designate is present in a display screen 901 corresponding to the image display unit 203.

The user wears the controller 120 on a hand 903, and a ray extending from the controller 120 is displayed. The ray indicates a designated position 905.

Figure 8:
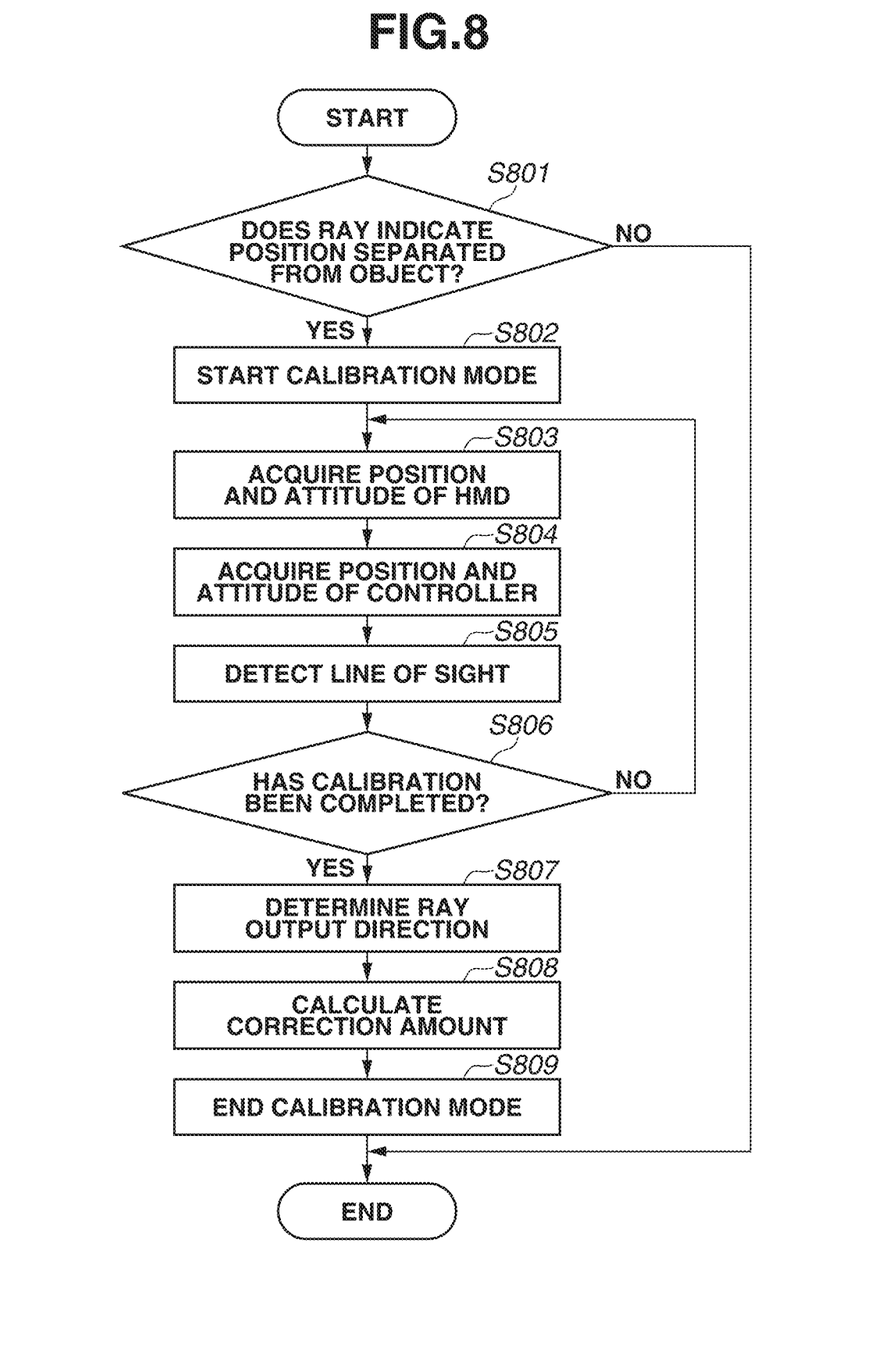
FIG. 8 is a flowchart illustrating a procedure of processing for determining a ray output direction according to one or more aspects of the present disclosure.
Figure 9A:
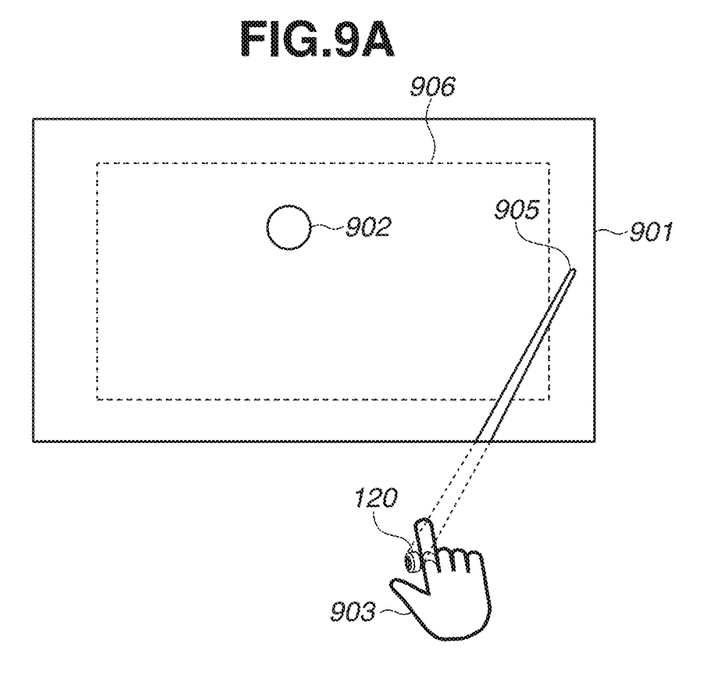
FIG. 9A is a diagram illustrating object display and a determination region according to one or more aspects of the present disclosure.

In step S801 in FIG. 8, the control unit 211 checks a selection state of the virtual object 902. The control unit 211 determines positional relationship between the position of the virtual object 902 and the position 905 designated with the ray by the user. In a case where the surrounding situation is little changed from the situation where the calibration is previously performed, it is assumed that, when the user takes an attitude for selecting the virtual object 902 by the controller 120, the ray indicates a vicinity of the virtual object 902. However, there is a case where the surrounding situation of the user is changed from the situation where the calibration is previously performed, and it is difficult for the user to take the attitude for indicating the virtual object 902. In such a case, the ray indicates a position separated from the virtual object 902. Thus, in step S801, in a case where the ray indicates a position separated from the virtual object 902 (YES in step S801), the control unit 211 determines that the surrounding situation of the user is changed and it is necessary to perform the calibration again, and the processing proceeds to step S802. In the determination on whether the ray indicates a position separated from the virtual object 902, for example, a region 906 illustrated in FIG. 9A is defined, and when the ray indicates a position outside the region 906, it is determined that the calibration is to be performed again. In step S801, in a case where the designated position 905 indicated by the ray is within the region 906 (NO in step S801), the control unit 211 determines that the calibration is unnecessary, and the processing ends without performing the calibration.

In step S802, the control unit 211 starts the calibration mode, and the processing proceeds to step S803. Steps S803 to S808 correspond to steps S301 to S306 in the first exemplary embodiment. Therefore, descriptions of steps are omitted.

Figure 9B:
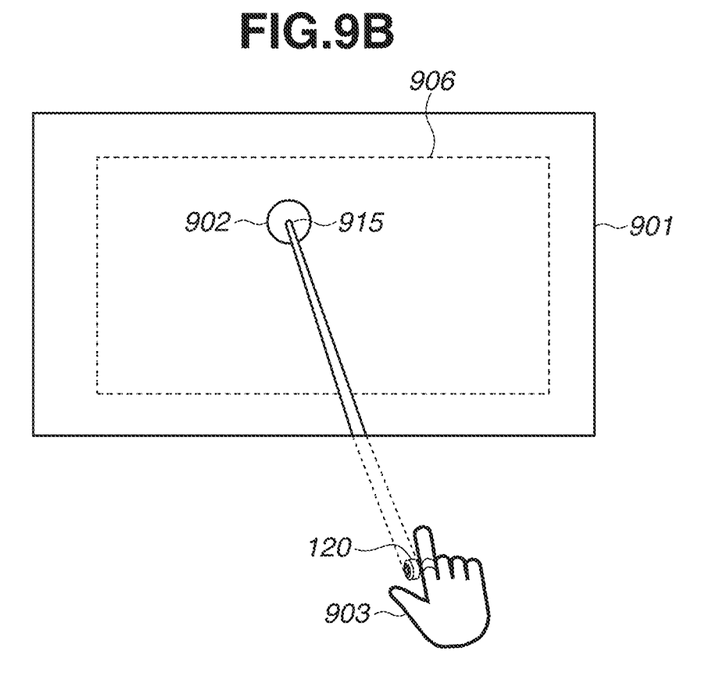
FIG. 9B is a diagram illustrating the object display and the determination region according to one or more aspects of the present disclosure.

In step S809, the control unit 211 ends the calibration mode. The processing then ends. When the calibration is completed, the ray extends from the controller 120 to point to a designated position 915 as illustrated in FIG. 9B.

In the second exemplary embodiment, the calibration is automatically performed. Therefore, to prevent the user from becoming confused during the calibration, the position of the line of sight and the ray during the calibration described in the first exemplary embodiment may not be displayed, and the corrected ray may be displayed after completion of the calibration.

The automatic calibration can sometimes cause inconvenience for the user. Therefore, execution of the automatic calibration may be notified to the user after the automatic calibration is performed, and the user may select whether to apply a calibration result.

While the preferred exemplary embodiments of the present disclosure are described above, the present disclosure is not limited to these exemplary embodiments, and can be variously modified and changed within the spirit of the present disclosure.

The present disclosure can be realized by supplying software (program) that implements the function of each of the above-described exemplary embodiments to a system or an apparatus via a network or various kinds of storage media, and causing a computer (or a control unit, microprocessing unit, etc.) of the system or the apparatus to read and execute program codes. In this case, the program and the storage medium storing the program constitute the present disclosure.

While the present disclosure is described in detail above based on the preferred exemplary embodiments, the present disclosure is not limited to these specific exemplary embodiments, and various forms without departing from the spirit of the disclosure are also included in the present disclosure. Parts of the above-described exemplary embodiments may be appropriately combined.

Each of the functional units in the above-described exemplary embodiments (modifications) may or may not be an individual hardware component. Functions of two or more functional units may be implemented by a common hardware component. A plurality of functions of one functional unit may each be implemented by an individual hardware component. Two or more functions of one functional unit may be implemented by a common hardware component. Each of the functional units may or may not be implemented by a hardware component such as an application specific integrated circuit (ASIC), a field programmable gate array (FPGA), and a digital signal processor (DSP). For example, an apparatus may include a processor and a memory (storage medium) storing a control program. Further, functions of at least a part of functional units of the apparatus may be implemented by causing the processor to read the control program from the memory and to execute the control program.

The present disclosure can be realized by supplying programs that implement one or more functions according to the above-described exemplary embodiments to a system or an apparatus via a network or a storage medium, and causing one or more processors in a computer of the system or the apparatus to read and execute the programs. In addition, the present disclosure can be realized by a circuit (e.g., ASIC) that implements one or more functions.

According to the exemplary embodiments, the following configurations are disclosed.

1. An information processing apparatus comprising:
   an acquisition unit configured to acquire information about a position or an attitude of a controller;
   a setting unit configured to set a reference for displaying a virtual object based on a predetermined region and the information acquired by the acquisition unit at a predetermined time point; and
   a control unit configured to control a display unit to display the virtual object based on the reference set by the setting unit and the information acquired by the acquisition unit.

2. An information processing apparatus comprising:
   an acquisition unit configured to acquire information about a position or an attitude of a controller;

a control unit configured to control a display unit to display a virtual object based on a first reference being a reference for displaying the virtual object, the reference being set in advance, and the information acquired by the acquisition unit; and a setting unit configured to set a second reference being a reference different from the first reference based on a predetermined region and the information acquired by the acquisition unit at a predetermined time point, wherein, in a case where the second reference is set by the setting unit, the control unit controls the display unit to display the virtual object based on the second reference and the information acquired by the acquisition unit.

3. The information processing apparatus according to configuration 1 or 2, wherein the acquisition unit acquires information about the position and the attitude of the controller.

4. The information processing apparatus according to any one of configurations 1 to 3, wherein the reference set by the setting unit is a reference relating to relationship between the position or the attitude of the controller and the predetermined region.

5. The information processing apparatus according to any one of configurations 1 to 4, wherein the reference set by the setting unit is a reference relating to a direction indicated by the controller.

6. The information processing apparatus according to any one of configurations 1 to 5,
wherein the virtual object is a ray extending from the controller or a hand of a user as a starting point, and
wherein the reference set by the setting unit is a reference relating to the starting point.

7. The information processing apparatus according to any one of configurations 1 to 5,
wherein the virtual object is a pointer, and
wherein the reference set by the setting unit is a reference relating to the position or the attitude of the controller, and a position of the pointer.

8. The information processing apparatus according to any one of configurations 1 to 5, wherein the reference set by the setting unit is a reference relating to a coordinate system with the controller as an origin.

9. The information processing apparatus according to configuration 8, wherein the setting unit sets a correction value relating to an angle at which the coordinate system is rotated with the controller as the origin, the controller serving as the first reference.

10. The information processing apparatus according to configuration 8, wherein the setting unit sets a correction value relating to a distance that the coordinate system parallelly shifts with the controller as the origin, the controller serving as the first reference.

11. The information processing apparatus according to any one of configurations 1 to 10, further comprising a second acquisition unit configured to acquire information on a line of sight of the user.

12. The information processing apparatus according to configuration 11, wherein the information on the line of sight is information indicating a position or a range.

13. The information processing apparatus according to configuration 11 or 12, wherein the predetermined region is a region based on the information on the line of sight of the user.

14. The information processing apparatus according to any one of configurations 11 to 13, wherein the predetermined time point is a time point at which input by the line of sight of the user is received.

15. The information processing apparatus according to any one of configurations 1 to 13, wherein the predetermined time point is a time point at which input via a button included in the controller is received.

16. The information processing apparatus according to any one of configurations 1 to 13, wherein the predetermined time point is a time point at which a state where the virtual object is within the predetermined region has continued for a predetermined time period.

17. The information processing apparatus according to any one of configurations 1 to 12 and 14 to 16, wherein the predetermined region is a region including a feature point of a real object.

18. The information processing apparatus according to any one of configurations 1 to 12 and 14 to 16, wherein the predetermined region is a region represented by a second virtual object different from the virtual object.

19. The information processing apparatus according to any one of configurations 1 to 18, further comprising:
a recording unit configured to record the references set by the setting unit; and
a selection unit configured to select any of the references recorded in the recording unit,
wherein the setting unit sets the reference selected by the selection unit.

20. A method of controlling an information processing apparatus, the method includes:
acquiring information about a position or an attitude of a controller;
setting a reference for displaying a virtual object based on a predetermined region and the information acquired at a predetermined time point; and
controlling a display unit to display the virtual object based on the set reference and the acquired information.

21. A program for causing a computer to function as each unit of the information processing apparatus according to any one of configurations 1 to 19.

22. An information processing system, includes:
a controller;
an acquisition device configured to acquire information about a position or an attitude of the controller;
a setting device configured to set a reference for displaying a virtual object based on a predetermined region and the information acquired by the acquisition device at a predetermined time point; and
a control device configured to control a display device to display the virtual object based on the reference set by the setting device and the information acquired by the acquisition device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-109527, filed Jul. 3, 2023, which is hereby incorporated by reference herein in its entirety.

What is claimed is:

1. An information processing apparatus connected to or integrated into a head-mounted display apparatus, the information processing apparatus comprising:
  a processor; and
  a memory storing a program which, when executed by the processor, causes the information processing apparatus to:
  acquire information about a position or an attitude of a controller;
  control a display to display a virtual object based on a first reference being a reference for displaying the virtual object, the reference being set in advance, and the acquired information;
  set a second reference as a substitute for the first reference to indicate a predetermined region designated by a user with a position or an attitude of the controller at a predetermined time point;
  control, in a case where the second reference is set, the display to display the virtual object based on the second reference and the acquired information; and
  receive, in a case where the second reference is not set, first operation from the controller based on a position of the virtual object displayed based on the first reference, and receive, in a case where the second reference is set, the first operation from the controller based on a position of the virtual object displayed based on the second reference.

2. The information processing apparatus according to claim 1,
  wherein the virtual object is a ray extending from the controller or a hand of the user as a starting point, and
  wherein the first reference and the second reference are references relating to the starting point.

3. The information processing apparatus according to claim 1,
  wherein the virtual object is a pointer, and
  wherein the first reference and the second reference are references relating to the position or the attitude of the controller, and a position of the pointer.

4. The information processing apparatus according to claim 1, wherein the first reference and the second reference are references relating to a coordinate system with the controller as an origin.

5. The information processing apparatus according to claim 4, wherein the second reference is set by setting a correction value relating to an angle at which the coordinate system is rotated with the controller as the origin, the controller serving as the first reference.

6. The information processing apparatus according to claim 4, wherein the second reference is set by setting a correction value relating to a distance that the coordinate system parallelly shifts with the controller as the origin, the controller serving as the first reference.

7. The information processing apparatus according to claim 1, wherein, when the program is executed by the processor, the program further causes the information processing apparatus to acquire information on a line of sight of the user.

8. The information processing apparatus according to claim 7, wherein the information on the line of sight is information indicating a position or a range.

9. The information processing apparatus according to claim 7, wherein the predetermined region is a region based on the information on the line of sight of the user.

10. The information processing apparatus according to claim 7, wherein the predetermined time point is a time point at which input by the line of sight of the user is received.

11. The information processing apparatus according to claim 1, wherein the predetermined time point is a time point at which input via a button included in the controller is received.

12. The information processing apparatus according to claim 1, wherein the predetermined time point is a time point at which a state where the virtual object is within the predetermined region has continued for a predetermined time period.

13. The information processing apparatus according to claim 1, wherein the predetermined region is a region including a feature point of a real object.

14. The information processing apparatus according to claim 1, wherein the predetermined region is a region represented by a second virtual object different from the virtual object.

15. The information processing apparatus according to claim 1, wherein, when the program is executed by the processor, the program further causes the information processing apparatus to:
  record the set references;
  select any of the recorded references; and
  set the selected reference.

16. The information processing apparatus according to claim 1, wherein a form of the virtual object operating in a first mode is controlled to be different from a form of the virtual object displayed based on the first reference or the second reference.

17. A method of controlling an information processing apparatus connected to or integrated into a head-mounted display apparatus, the method comprising:
  acquiring information about a position or an attitude of a controller;
  controlling a display to display a virtual object based on a first reference being a reference for displaying the virtual object, the reference being set in advance, and the acquired information;
  setting a second reference as a substitute for the first reference to indicate a predetermined region designated by a user with a position or an attitude of the controller at a predetermined time point;

controlling, in a case where the second reference is set, the display to display the virtual object based on the second reference and the acquired information; and receiving, in a case where the second reference is not set, first operation from the controller based on a position of the virtual object displayed based on the first reference, and receiving, in a case where the second reference is set, the first operation from the controller based on a position of the virtual object displayed based on the second reference.

18. A non-transitory computer-readable storage medium storing a program for causing a computer to execute a method for controlling an information processing apparatus connected to or integrated into a head-mounted display apparatus, the method comprising:

acquiring information about a position or an attitude of a controller;

controlling a display to display a virtual object based on a first reference being a reference for displaying the virtual object, the reference being set in advance, and the acquired information;

setting a second reference as a substitute for the first reference to indicate a predetermined region designated by a user with a position or an attitude of the controller at a predetermined time point;

controlling, in a case where the second reference is set, the display to display the virtual object based on the second reference and the acquired information; and receiving, in a case where the second reference is not set, first operation from the controller based on a position of the virtual object displayed based on the first reference, and receiving, in a case where the second reference is set, the first operation from the controller based on a position of the virtual object displayed based on the second reference.

19. An information processing system, comprising:

a head-mounted display apparatus;

a controller;

an acquisition device configured to acquire information about a position or an attitude of the controller;

a control device configured to control the head-mounted display apparatus to display a virtual object based on a first reference being a reference for displaying the virtual object, the reference being set in advance, and the information acquired by the acquisition device;

a setting device configured to set a second reference as a substitute for the first reference to indicate a predetermined region designated by a user with a position or an attitude of the controller at a predetermined time point;

a control device configured to control, in a case where the second reference is set, the head-mounted display apparatus to display the virtual object based on the second reference and the information acquired by the acquisition device; and a reception device configured to receive, in a case where the second reference is not set, first operation from the controller based on a position of the virtual object displayed based on the first reference, and to receive, in a case where the second reference is set, the first operation from the controller based on a position of the virtual object displayed based on the second reference.

* * * * *